(12) United States Patent
Mitsumori

(10) Patent No.: US 9,548,929 B2
(45) Date of Patent: Jan. 17, 2017

(54) FRAME TRANSFER APPARATUS AND FRAME TRANSFER METHOD

(71) Applicant: FUJITSU LIMITED, Kawasaki-shi, Kanagawa (JP)

(72) Inventor: Yasuyuki Mitsumori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 118 days.

(21) Appl. No.: 13/961,151

(22) Filed: Aug. 7, 2013

(65) Prior Publication Data
US 2014/0105020 A1    Apr. 17, 2014

(30) Foreign Application Priority Data

Oct. 12, 2012    (JP) ................. 2012-227164

(51) Int. Cl.
*H04L 12/801*     (2013.01)
*H04L 12/947*     (2013.01)
*H04L 12/819*     (2013.01)
*H04L 12/851*     (2013.01)

(52) U.S. Cl.
CPC .............. *H04L 47/16* (2013.01); *H04L 49/25* (2013.01); *H04L 47/215* (2013.01); *H04L 47/2441* (2013.01)

(58) Field of Classification Search
None
See application file for complete search history.

(56) References Cited

U.S. PATENT DOCUMENTS 6,175,571 B1 *    1/2001    Haddock et al. ............. 370/423
2012/0209941 A1 *    8/2012    Yamamoto .................... 709/212

FOREIGN PATENT DOCUMENTS

| JP | 2005-167881 | 6/2005 |
| JP | 2009-239836 | 10/2009 |
| JP | 2010-114724 | 5/2010 |
| JP | 2012-114646 | 6/2012 |

* cited by examiner

*Primary Examiner* — Hassan Phillips
*Assistant Examiner* — Omeed D Rahgozar
(74) *Attorney, Agent, or Firm* — Staas & Halsey LLP

(57) ABSTRACT

There is provided a frame transfer apparatus, which includes: a storage unit configured to store an address and a port in association with the address; a receiving unit configured to receive a frame; a switch unit configured to determine an output port based on a destination address of a received frame; and a transmitting unit configured to transmit the received frame, from the output port determined by the switch unit, wherein the switch unit includes a copying unit configured to copy the received frame when the destination address of the received frame has not been stored in the storage unit, and a rate control unit configured to control an output rate of a frame to be copied.

6 Claims, 13 Drawing Sheets

| INDEX: MAC ADDRESS | VALID FLAG | IF CARD NUMBER | PORT NUMBER | AGING FLAG |
|---|---|---|---|---|
| xx:xx:xx:xx:xx:01 | 1 | CARD NUMBER #1 | PORT NUMBER #1 | 1 |
| xx:xx:xx:xx:xx:12 | 1 | CARD NUMBER #1 | PORT NUMBER #1 | 0 |
| xx:xx:xx:xx:xx:23 | 0 | CARD NUMBER #1 | PORT NUMBER #2 | 0 |
| ⋮ | ⋮ | ⋮ | ⋮ | ⋮ |

| INDEX: SOURCE CARD NUMBER +SOURCE PORT NUMBER+VID | VALID FLAG | FIRST FLOW ID | SECOND FLOW ID | AGING TIME | FRAME COPY INFORMATION | | | |
|---|---|---|---|---|---|---|---|---|
| | | | | | C1P1 | C1P2 | ... | CnPn |
| CARD NUMBER #1+ PORT NUMBER #1+VID#1 | 1 | 1 | 1 | 5 MIMUTES | 0 | 1 | ... | 0 |
| CARD NUMBER #1+ PORT NUMBER #1+VID#2 | 1 | 1 | 1 | 5 MIMUTES | 1 | 0 | ... | 0 |
| CARD NUMBER #1+ PORT NUMBER #1+VID#3 | 1 | 2 | 2 | 3 MIMUTES | 1 | 1 | ... | 0 |
| ... | ... | ... | ... | ... | ... | ... | ... | ... |
| CARD NUMBER #L+ PORT NUMBER #M+VID#N | 0 | 2 | 0 | 0 | 0 | 0 | ... | 0 |

| INDEX: FIRST DESIGNATION RATE ID | UPPER LIMIT RATE [bps] | BURST SIZE [byte] |
|---|---|---|
| 1 | 10M | 100K |
| 2 | 5M | 50K |
| ⋮ | ⋮ | ⋮ |

| INDEX: SECOND DESIGNATION RATE ID | UPPER LIMIT RATE [bps] | BURST SIZE [byte] |
|---|---|---|
| 1 | 10M | 100K |
| 2 | 5M | 50K |
| ⋮ | ⋮ | ⋮ |

FIG. 10

| INDEX: SOURCE CARD NUMBER +SOURCE PORT NUMBER+VID | VALID FLAG | FIRST FLOW ID | SECOND FLOW ID | AGING TIME | FRAME COPY INFORMATION | | | | THE NUMBER OF COPIES |
|---|---|---|---|---|---|---|---|---|---|
| | | | | | C1P1 | C1P2 | ... | CnPn | |
| CARD NUMBER #1+ PORT NUMBER #1+VID#1 | 1 | 1 | 1 | 5 MIMUTES | 0 | 1 | ... | 0 | 3 |
| CARD NUMBER #1+ PORT NUMBER #1+VID#2 | 1 | 1 | 1 | 5 MIMUTES | 1 | 0 | ... | 0 | 3 |
| CARD NUMBER #1+ PORT NUMBER #1+VID#3 | 1 | 2 | 2 | 3 MIMUTES | 1 | 1 | ... | 0 | 5 |
| ... | ... | ... | ... | ... | ... | ... | ... | ... | ... |
| CARD NUMBER #L+ PORT NUMBER #M+VID#N | 0 | 2 | 0 | 0 | 0 | 0 | ... | 0 | 0 |

| INDEX: SOURCE CARD NUMBER +SOURCE PORT NUMBER+VID | VALID FLAG | FIRST FLOW ID | SECOND FLOW ID | AGING TIME | FRAME COPY INFORMATION | | | CLASS CONVERSION ID |
|---|---|---|---|---|---|---|---|---|
| | | | | | C1P1 | C1P2 | ... CnPn | |
| CARD NUMBER #1+ PORT NUMBER #1+VID#1 | 1 | 1 | 1 | 5 MIMUTES | 0 | 1 | ... 0 | 3 |
| CARD NUMBER #1+ PORT NUMBER #1+VID#2 | 1 | 1 | 1 | 5 MIMUTES | 1 | 0 | ... 0 | 3 |
| CARD NUMBER #1+ PORT NUMBER #1+VID#3 | 1 | 2 | 2 | 3 MIMUTES | 1 | 1 | ... 0 | 2 |
| ... | ... | ... | ... | ... | ... | ... | ... | ... |
| CARD NUMBER #L+ PORT NUMBER #M+VID#N | 0 | 2 | 0 | 0 | 0 | 0 | ... 0 | 0 |

FIG. 13

| INDEX: CLASS CONVERSION ID + VLAN PRIORITY | INTERNAL PRIORITY |
|---|---|
| CLASS CONVERSION ID #0 + VLAN PRIORITY#0 | LOW PRIORITY |
| CLASS CONVERSION ID #0 + VLAN PRIORITY#1 | LOW PRIORITY |
| CLASS CONVERSION ID #0 + VLAN PRIORITY#2 | INTERMEDIATE PRIORITY |
| CLASS CONVERSION ID #0 + VLAN PRIORITY#3 | INTERMEDIATE PRIORITY |
| CLASS CONVERSION ID #0 + VLAN PRIORITY#4 | INTERMEDIATE PRIORITY |
| CLASS CONVERSION ID #0 + VLAN PRIORITY#5 | INTERMEDIATE PRIORITY |
| CLASS CONVERSION ID #0 + VLAN PRIORITY#6 | HIGH PRIORITY |
| CLASS CONVERSION ID #0 + VLAN PRIORITY#7 | HIGH PRIORITY |
| CLASS CONVERSION ID #1 + VLAN PRIORITY#0 | LOW PRIORITY |
| CLASS CONVERSION ID #1 + VLAN PRIORITY#1 | INTERMEDIATE PRIORITY |
| ⋮ | ⋮ |

| INDEX: FIRST DESIGNATION RATE ID | HIGH PRIORITY | | INTERMEDIATE PRIORITY | | LOW PRIORITY | |
|---|---|---|---|---|---|---|
| | UPPER LIMIT RATE [bps] | BURST SIZE [byte] | UPPER LIMIT RATE [bps] | BURST SIZE [byte] | UPPER LIMIT RATE [bps] | BURST SIZE [byte] |
| 1 | 15M | 150K | 10M | 100K | 5M | 50K |
| 2 | 5M | 50K | 2.5M | 25K | 1.25M | 12.5K |
| ... | ... | ... | ... | ... | ... | ... |

| INDEX: SECOND DESIGNATION RATE ID | HIGH PRIORITY | | INTERMEDIATE PRIORITY | | LOW PRIORITY | |
|---|---|---|---|---|---|---|
| | UPPER LIMIT RATE [bps] | BURST SIZE [byte] | UPPER LIMIT RATE [bps] | BURST SIZE [byte] | UPPER LIMIT RATE [bps] | BURST SIZE [byte] |
| 1 | 15M | 150K | 10M | 100K | 5M | 50K |
| 2 | 5M | 50K | 2.5M | 25K | 1.25M | 12.5K |
| ... | ... | ... | ... | ... | ... | ... |

FRAME TRANSFER APPARATUS AND FRAME TRANSFER METHOD

CROSS-REFERENCE TO RELATED APPLICATION

This application is based upon and claims the benefit of priority of the prior Japanese Patent Application No. 2012-227164 filed on Oct. 12, 2012, the entire contents of which are incorporated herein by reference.

FIELD

Embodiments disclosed herein are related to a frame transfer apparatus and a frame transfer method.

BACKGROUND

A frame transfer apparatus transferring communication packets or frames, upon receipt of a frame having an unknown destination address copies the received frame and outputs the frame from all of the ports except for the receiving port that received the frame. Such a processing is called a "flooding".

When a frame transfer apparatus receives a large amount of frames each having an unknown destination address, each of the received frames is copied and output from a plurality of ports, and therefore, congestion occurs in a communication apparatus or a network. As a result, transferring of a frame having a known destination address is affected.

Japanese Laid-Open Patent Publication No. 2010-114724 discloses a technique in which a memory region per unit of port within a forwarding data base (FDB) is dynamically changed depending on communication situation in order to avoid an unnecessary flooding.

SUMMARY

According to an aspect of the present disclosure, there is provided a frame transfer apparatus, which includes: a storage unit configured to store an address and a port in association with the address; a receiving unit configured to receive a frame; a switch unit configured to determine an output port based on a destination address of a received frame; and a transmitting unit configured to transmit the received frame, from the output port determined by the switch unit, wherein the switch unit includes a copying unit configured to copy the received frame when the destination address of the received frame has not been stored in the storage unit, and a rate control unit configured to control an output rate of a frame to be copied.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a view explaining a first example of a flow table.

FIG. 8A is a view explaining a first example of a first setting table and FIG. 8B is a view explaining a first example of a second setting table.

FIG. 10 is a view explaining a second example of the flow table.

FIG. 12 is a view explaining a third example of the flow table.

FIG. 13 is a view explaining an exemplary class conversion table.

FIG. 14A is a view explaining a second example of the first setting table and FIG. 14B is a view explaining a second example of the second setting table.

DESCRIPTION OF EMBODIMENTS

First Embodiment

Figure 1:
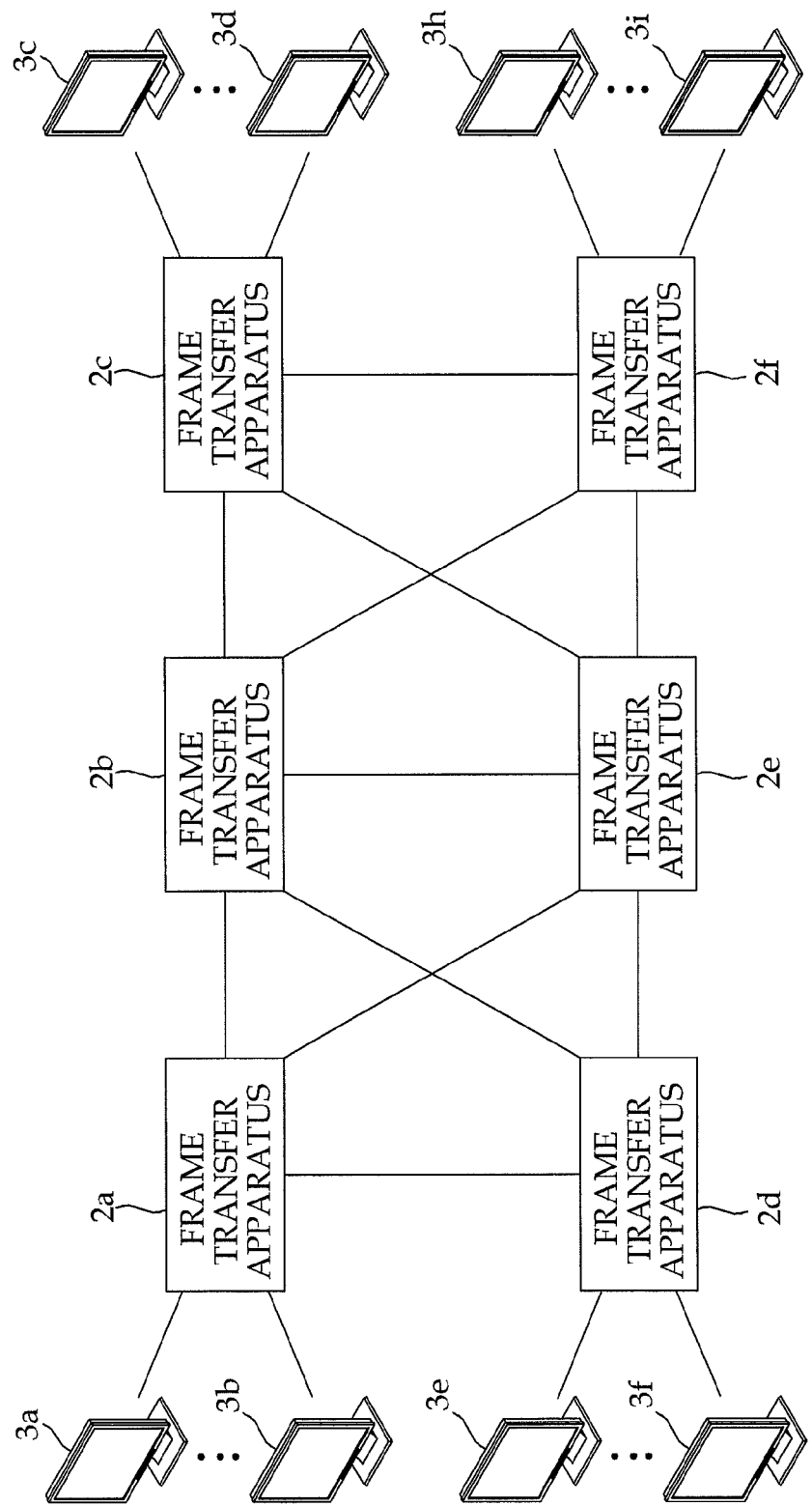
FIG. 1 is a diagram illustrating an exemplary configuration of a communication network.

Hereinafter, exemplary embodiments will be described with reference to the accompanying drawings. FIG. 1 is a diagram illustrating an exemplary configuration of a communication network. The frame transfer apparatuses 2a to 2f and user terminal devices 3a to 3i are disposed in the communication network 1. The frame transfer apparatuses 2a to 2f may be a communication apparatus which transmits and receives, for example, a communication packet or a communication frame, or may be a server apparatus which performs a data transfer. In the following description and drawings, the frame transfer apparatuses 2a to 2f and the user terminal devices 3a and 3i may be collectively represented as "the frame transfer apparatus 2" and "user terminal device 3", respectively.

The frame transfer apparatus 2 receives a frame transmitted from the user terminal device 3 and transfers the received frame to a designated destination based on address information set in the frame. The frame transmitted from the user terminal device 3 is, for example, a Media Access Control (MAC) frame or an Internet Protocol (IP) packet. When the user terminal device 3 transmits the MAC frame, the frame transfer apparatus 2 performs a frame transfer based on a MAC address set in the MAC frame. When the user terminal device 3 transmits an IP packet, the frame transfer apparatus 2 performs a frame transfer based on an IP address set in the IP packet.

In the following description, a case where a frame transferred by the frame transfer apparatus 2 is a MAC frame is exemplified. But, in the exemplification, the frame transfer apparatus is not intended to be limited applied only to an apparatus which transfers the MAC frame. The frame transfer apparatus described in the present application may be widely applied to a frame transfer apparatus which transfers the frame based on destination information set in the frame.

Figure 2:
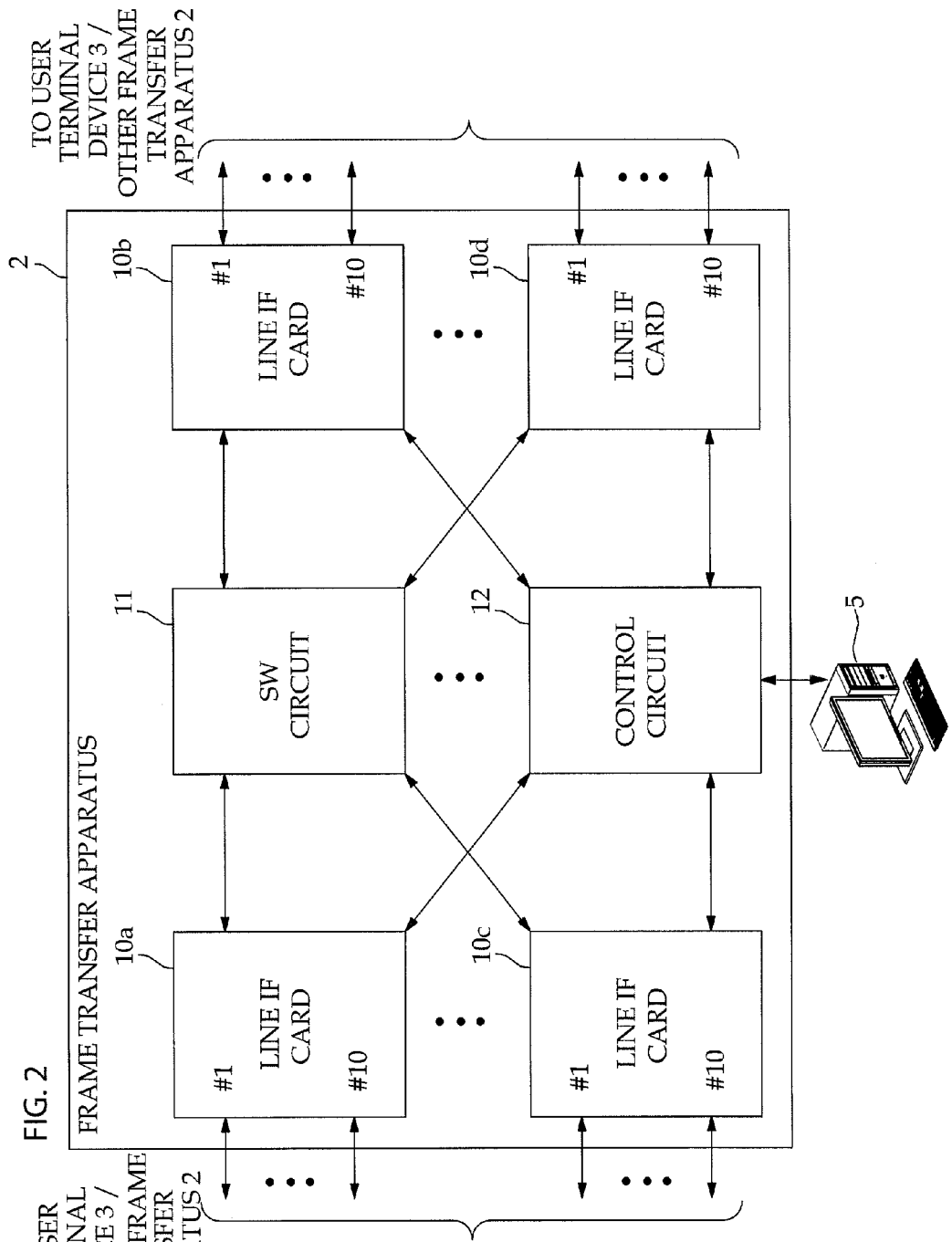
FIG. 2 is a diagram explaining an exemplary hardware configuration of a frame transfer apparatus.

FIG. 2 is a diagram explaining an exemplary hardware configuration of the frame transfer apparatus 2. The frame transfer apparatus 2 includes line IF cards 10a, 10b, 10c, 10d, a switch circuit 11, and a control circuit 12. In the following description and drawings, an interface and a switch may be represented by "IF" and "SW", respectively. Further, the line IF cards 10a, 10b, 10c, 10d may be collectively represented as a line IF card 10.

The line IF card 10 accommodates line ports #1 to #10 to have a function of interfacing with an external device and performs a processing for a received frame and a processing for a frame to be transmitted. A circuit constituting the line IF card 10 may be provided in a detachable module or card. Further, in the present application, a case where each line IF card 10 accommodates ten line ports #1 to #10 is exemplified, but the number of ports accommodated in the line IF card 10 may be other than ten (10). Further, each number of ports accommodated in each line IF card 10 may be either the same or different from one another.

A SW circuit 11 is connected with the line IF card 10 in the frame transfer apparatus 2 to performs a switch processing for the frame transfer between the line IF cards 10, that is, a route determination processing. The SW circuit 11 may be provided as a detachable module or card.

The control circuit 12 is connected with the line IF card 10 and the SW circuit 11 in the frame transfer apparatus 2 to perform setting of each card or module and collecting alarm and statistical information in the frame transfer apparatus 2. The control circuit 12 is also connected with, for example, a control terminal device 5 to receive setting information from the control terminal device 5 and output the collected alarm and statistical information alarm to the control terminal device 5. The control circuit 12 may be provided as a detachable module or card.

Further, the line IF card 10, the SW circuit 11 and the control circuit 12 may be integrally formed with a motherboard or mother card of the frame transfer apparatus 2 without being provided in a detachable fashion. Further, the hardware configuration illustrated in FIG. 2 is merely an exemplification for describing the embodiment. The frame transfer apparatus 2 in the present application may adopt any type of hardware configuration other than the hardware configuration described above as long as the frame transfer apparatus 2 can execute the above-described operations.

Figure 3:
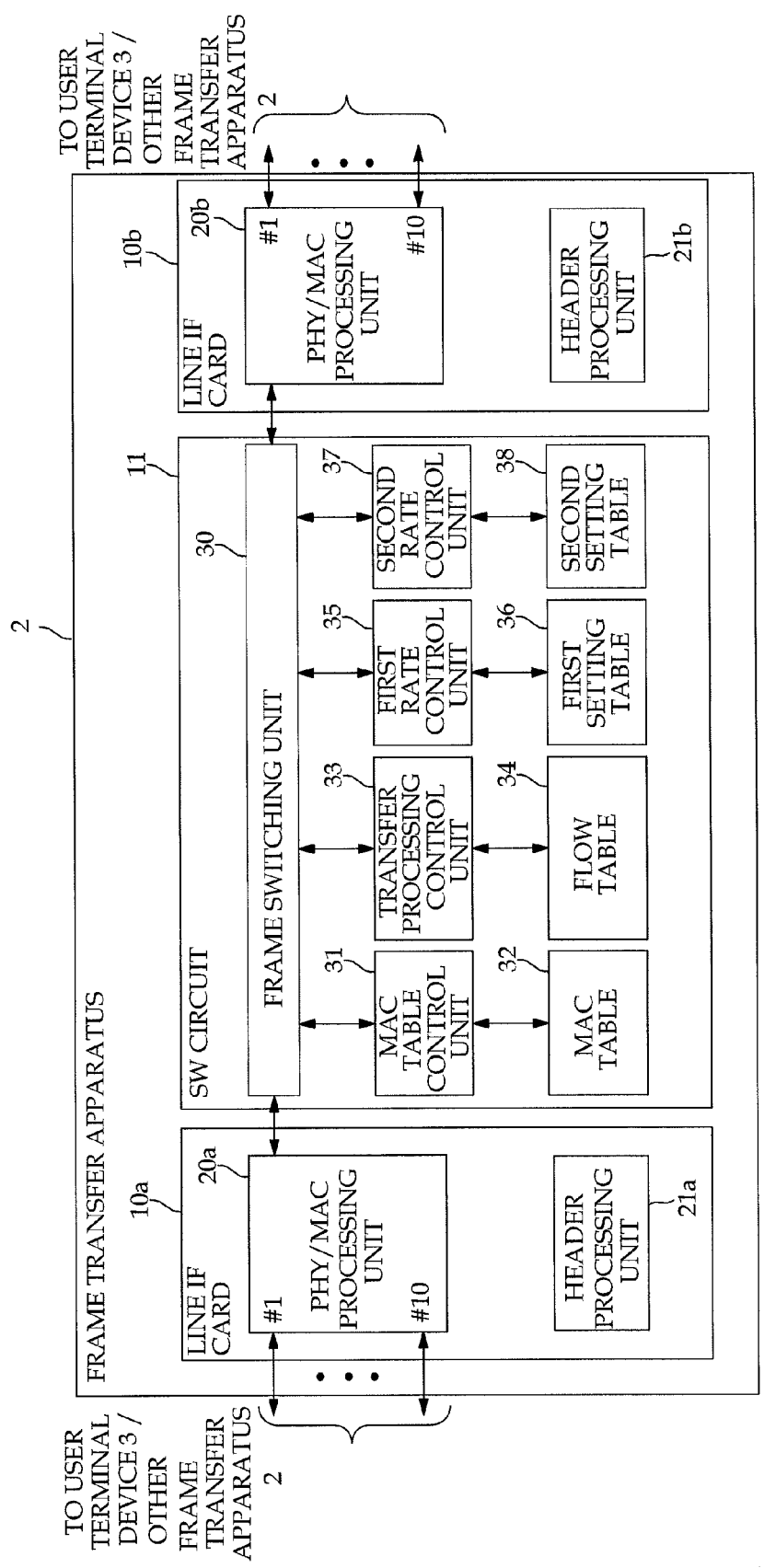
FIG. 3 is a functional block diagram illustrating a configuration of a first embodiment of the frame transfer apparatus.

FIG. 3 is a functional block diagram illustrating a configuration of a first embodiment of the frame transfer apparatus 2. In FIG. 3, the line IF cards 10a and 10b of the line IF card 10 are representatively illustrated. Further, the functional block diagrams of FIG. 3 and FIG. 11 to be described later are illustrated using the configuration relating to the functions of the frame transfer apparatus 2 described in the present application as the basis. The frame transfer apparatus 2 may include other components in addition to those illustrated in FIG. 3.

The line IF card 10a includes a PHY (Physical)/MAC processing unit 20a and a header processing unit 21a. The line IF card 10b includes a PHY/MAC processing unit 20b and a header processing unit 21b.

The SW circuit 11 includes a frame switching unit 30, a MAC table control unit 31, a MAC table 32, a transfer processing control unit 33, a flow table 34, a first rate control unit 35, a first setting table 36, a second rate control unit 36 and a second setting table 38.

The PHY/MAC processing units 20a and 20b each include a circuit which performs a signal processing in a physical layer for terminating the MAC frame and a MAC layer. The header processing units 21a and 21b add an internal frame header to the received MAC frame. In the following description, the MAC frame added with the internal frame header is represented as "internal frame".

Figure 4A:
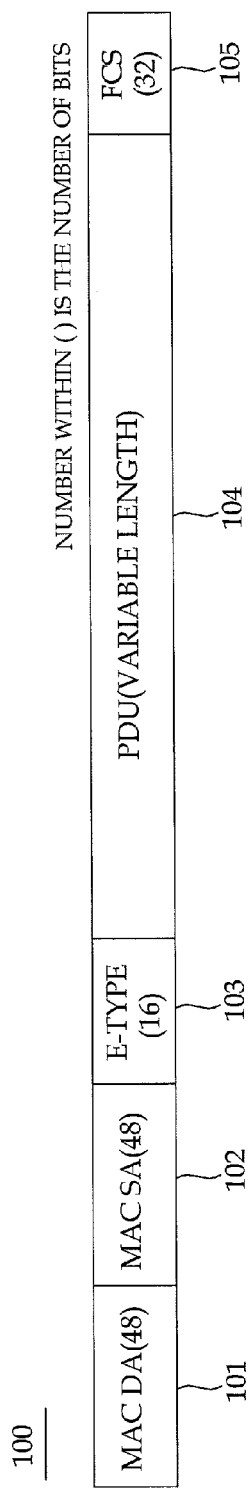
FIGS. 4A and 4B are views explaining examples of a frame format of a Media Access Control (MAC) frame.

FIG. 4A is a view explaining an example of a frame format of a MAC frame in which a Virtual Local Area Network (VLAN) tag is not included. The MAC frame 100 includes a MAC DA field 101, a MAC SA field 102, an E-TYPE field 103, a PDU field 104 and a FCS field 105.

A destination MAC address is set in the MAC DA field 101. A source MAC address is set in the MAC SA field 102. Further, in the following description and drawings, the destination MAC address and the source MAC address may be represented as "MAC DA" and "MAC SA", respectively.

Ethernet (registered trademark) type code identifying an upper layer protocol is set in the E-TYPE field 103. An upper layer message is set in the PDU field 104. An error detection code is set in the FCS field 105.

Figure 4B:
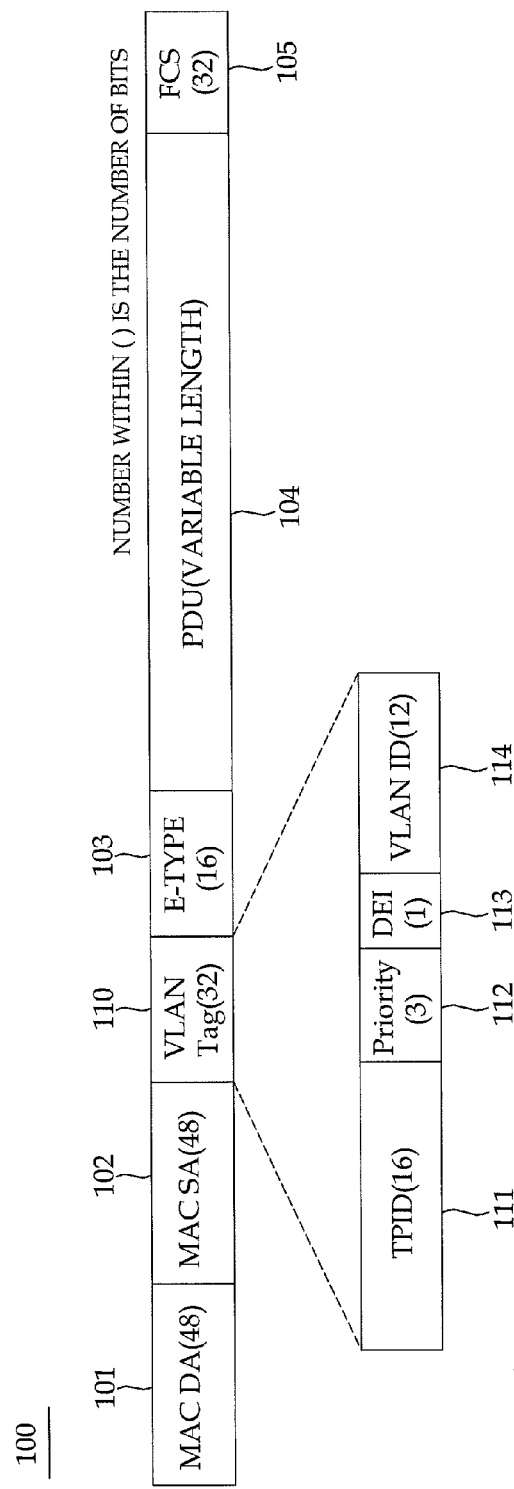

FIG. 4B is a view explaining an example of a frame format of the MAC frame including the VLAN tag. The MAC frame 100 includes a VLAN Tag field 110 in addition to the fields 101 to 105 of FIG. 4A. The VLAN Tag field 110 includes a TPID field 111, a priority field 112, a DEI field 113, and a VLAN ID field 114.

A value of "0x8100" indicating a frame added with a tag is set in the TPID field 111. The priority field 112 is a 3-bit field designating a priority and can designate priority from the lowest priority having a value of "0(000)" to the highest priority having a value of "7(111)".

The DEI field 113 designates a discard priority. A VLAN ID which is an identifier for specifying a user is set in the VLAN ID field 114. In the following description and drawings, the VLAN ID may be represented as "VID". The VID along with a value of the TPID field 111 may be referred to as a VLAN tag. Further, a plurality of VLAN Tags may be included in plural.

Figures 5, 6:
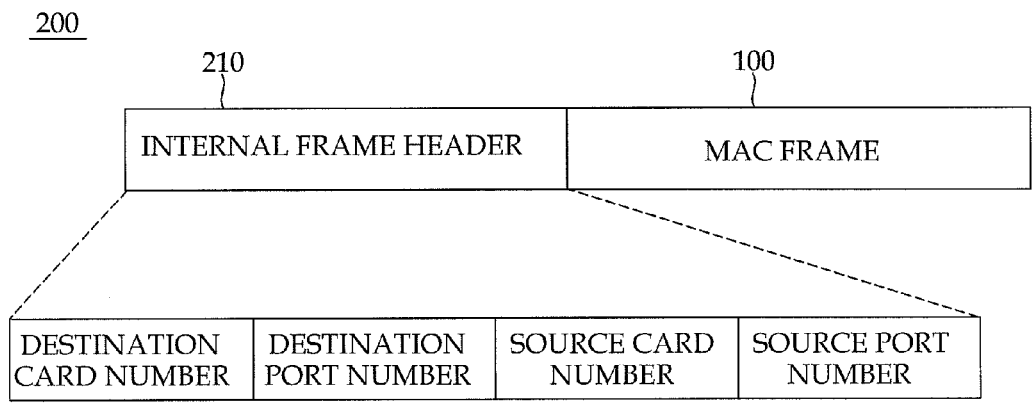
FIG. 5 is a view explaining an example of a frame format of an internal frame.
FIG. 6 is a view explaining an example of a MAC table.

FIG. 5 is a view explaining an example of a frame format of the internal frame. The internal frame 200 includes an internal frame header 210 and the MAC frame 100 illustrated in FIG. 4A or FIG. 4B. The numbers including a destination card number, a destination port number, a source card number and a source ort number are set in the internal frame header 210.

Referring back to FIG. 3, the header processing units 21a and 21b set a port number of the line port and a card number of the line IF card 10 which has received the MAC frame in the internal frame header added to the MAC frame as the source port number and the source card number, respectively. The line IF card 10 transmits the internal frame to the SW circuit 11.

The frame switch unit 30 performs a switch processing in which the internal frame received by the SW circuit 11 is transferred to the line IF card 10 in association with the MAC DA of the MAC frame included in the internal frame. When the MAC DA has not been known in the MAC table 32, the frame switch unit 30 performs a copy processing for flooding the internal frame. Hereinafter, the internal frame is described as "frame" in a description of function and operation of the SW circuit 11.

The MAC table control unit 31 determines whether a MAC DA of the frame received by the SW circuit 11 has been known by a learning process in the MAC table 32.

FIG. 6 is a view explaining an example of the MAC table 32. The MAC table 32 is referenced by using the MAC DA of the received frame as an index in an index column. The MAC table 32 includes "valid flag", "IF card number", "port number" and "aging flag" as information elements.

When an entry is valid, the "valid flag" has a value of "1" and when an entry is invalid, the "valid flag" has a value of "0". The "IF card number" and the "port number" indicate a port number of the line port and a card number of the line IF card 10 which has received the MAC address of the index as the source MAC address, respectively. The "aging flag" is set to "1" during a learning process of the MAC address, and then, reset to "0" after a predetermined time has elapsed.

For example, a first entry has a MAC address of "xx:xx:xx:xx:xx:01" as the index. The value "1" of the "valid flag" indicates that the entry is valid, and the known card number and port number correspond to "card number #1" and "port number #1", respectively. Further, in this case, the value of the flag of the entry is "1".

The MAC address serving as an index may be compressed to the number of bits smaller than the original 48 bits through, such as a hashing operation. Further, the MAC table 32 may be implemented with a Static Random Access Memory (SRAM), a Dynamic Random Access Memory (DRAM), and a Content Addressable Memory (CAM). In a case of the CAM memory, a retrieval key of the CAM memory which uses the MAC address as a base may be used as a memory index. The physical configuration of the MAC table 32 is irrelevant and out of question here.

In a case where the MAC DA has been known by a learning process, the MAC table control unit 31 reads the "IF card number" and the "port number" from the MAC table 32 and sets the "IF card number" and the "port number" in the internal frame header 210 as the destination card number and the destination port number, respectively.

If the value of the aging flag of an entry is "1" when reading-out the entire entry periodically as an aging processing for the MAC table 32, the MAC table control unit 31 resets the value of the aging flag to "0". When the value of the aging flag of an entry is "0", the MAC table control unit 31 resets the valid flag of the entry to "0" and makes the entry to be an empty entry.

The MAC table control unit 31 sets a MAC SA of the frame, a port number of the line port and a card number of the line IF card 10 which has received the frame in the MAC table 32 and thus, becomes to know the MAC SA.

Referring to FIG. 3 again, the transfer processing control unit 33 distributes the received frame to a plurality of flows based on the source card number, the source port number and the VID of the received frame. The transfer processing control unit 33 generates a plurality of first flows in which the received frames to be subjected to the flooding are distributed based on a source card number, a source port number and a VID. Further, the transfer processing control unit 33 generates a plurality of second flows in which the received frames are distributed based on the source card number, the source port number and the VID irrespective of whether the received frames is to be subjected to the flooding.

The first rate control unit 35 controls the frame rate to be subjected to the switch processing and a copy processing by the frame switch unit 30 for each of the plurality of the first flows. Further, the second rate control unit 37 controls the frame rate to be subjected to the switch processing by the frame switch unit 30 for each of the plurality of the second flows. The transfer processing control unit 33 designates the line port to which the frame switch unit 30 transmits a copy of the received frame during the flooding.

The transfer processing control unit 33 references a flow table 34 using a combination of the source card number and the source port number and the VID set in the internal frame header 210 of the received frame as an index.

FIG. 7 is a view explaining a first example of the flow table 34. The flow table 34 includes "valid flag", "first flow ID", "second flow ID", "aging time" and "frame copy information" as information elements. The "valid flag" has a value of "1" when the entry is valid and a value of "0" when the entry is invalid.

The "first flow ID" is an identifier identifying one of a plurality of first flows which corresponds to a destination of the received frame to be subjected to the flooding. The "second flow ID" is an identifier identifying one of a plurality of second flows which corresponds to a destination of the received frame.

The "aging time" designates an aging time of the entry of the MAC table 32 in association with a combination of "the source card number" and "the source port number" and the VID as index. The MAC table control unit 31 performs an aging of the MAC table 32 at an interval designated by the "aging time".

The "frame copy information" designates the line port to which a copy of the received frame is transmitted by the frame switch unit 30 during the flooding. A code CmPn indicates a line port #n of the line IF card 10 having a card number #m, and the copy is transmitted only to a port to which the value of "1" is allocated, and is not transmitted to a port to which the value of "0" is allocated.

For example, a first entry has the source card number indicated as "card number #1", the source port number indicated as "port number #1", and VID indicated as "VID #1". The value "1" of the "valid flag" indicates that the entry is valid.

An identifier of the first flow to which the frame of which the source card number, the source port number and the VID is "card number #1", "port number #1" and the "VID #1", respectively, is distributed is "1". Further, an identifier of the second flow to which the frame is distributed is "1". During the flooding, the frame is transferred to the line port #2 of the line IF card 10 having a card number #1 (indicated as C1P2 in FIG. 7).

The aging time of the entry of the MAC table 32 in which the "card number #1" and the "port number #1" is set is designated as "5 minutes".

Further, when a plurality of VLAN tags are included in the received frame, a plurality of VIDs may be used in an index. For example, when the flow table 34 is a SRAM or a DRAM memory, a plurality of VIDs may be included to be used in the index.

Further, when the flow table 34 is implemented by the CAM, the source card number, the source port number and the VID may be used as a retrieval key. When a plurality of VLAN tags are included in the received frame, a plurality of VIDs may be used as a retrieval key. Further, when the VLAN tag is not included in the received frame, a portion of the VLAN tag of the retrieval key may be masked to be used as a retrieval key. Further, the physical configuration of the flow table 34 is irrelevant and out of question here.

Referring to FIG. 3 again, when the value of the "valid flag" of the entry corresponding to an index is "0", the transfer processing control unit 33 regards the received frame as a frame which is not defined in the VLAN and discards the received frame. When the value of the "valid flag" is "1", the transfer processing control unit 33 does not discard the received frame, and reads-out a first flow ID, a second flow ID and frame copy information from the flow table 34.

The first rate control unit 35 controls the rate of the first flow in which the received frame of which the MAC DA has not been known in the MAC table 32 is distributed according to a token bucket scheme. The upper limit rate and the burst size used in a token bucket control are designated for each first flow ID in the first setting table 36.

FIG. 8A is a view explaining the first example of the first setting table 36. The first setting table 36 is referenced by using the first flow ID as the index, and includes the "upper limit rate" and the "burst size" as information elements. The "upper limit rate" and the "burst size" indicates an upper limit rate and a burst size used for the token bucket control of the first flow identified with the first flow ID of the index.

For example, the upper limit rate and the burst size used for the token bucket control of the first flow identified with a first flow ID "1" for the first entry are set to "10 Mbps" and "100 Kbyte", respectively. Further, in the following description and drawings, the upper limit rate of the first flow may be represented as a "first upper limit rate".

The first rate control unit 35 supplies tokens to a bucket at a rate not exceeding the first upper limit rate for each flow. An amount of tokens corresponding to a preset burst size may be accumulated in the bucket. The first rate control unit 35 takes out tokens corresponding to the number of bytes which amounts to a packet length of the received frame from the bucket.

In a case where the number of tokens within the bucket becomes less than "0" when the tokens are taken out from the bucket, the total of the first flow rate is regarded as exceeding the first upper limit rate and thus, the tokens are not taken out from the bucket and the received frame is discarded. In a case where the number of remaining tokens is "0" or more even when tokens are taken out from the bucket, the total of the first flow rate is regarded as not exceeding the first upper limit rate and thus, the tokens are taken out from the bucket and the received frame is not discarded.

The received frame where the rate is controlled by the first rate control unit 35 and the received frame where the MAC DA has been known by a learning process in the MAC table 32 are distributed to a plurality of second flows using the second flow ID. Both the received frame where rate is controlled by the first rate control unit 35 and the received frame where the MAC DA has been known by a learning process in the MAC table 32 may coexist in the same second frame. The second rate control unit 37 controls a rate of the second flow in a token bucket scheme. The upper limit rate and burst size used in the token bucket control of the second flow are designated for each second flow ID in the second setting table 38.

FIG. 8B is a view explaining a first example of the second setting table 38. The second setting table 38 is referenced by using a second flow ID as the index, and includes the "upper limit rate" and the "burst size" as information elements. The "upper limit rate" and the "burst size" indicates an upper limit rate and a burst size used in the token bucket control of the second flow identified with a second flow ID of the index.

For example, the upper limit rate and the burst size used for token bucket control of the first flow identified with a second flow ID "1" for the first entry are set to "10 Mbps" and "100 Kbyte", respectively. Further, in the following description and drawings, the upper limit rate of the second flow may be indicated as a "second upper limit rate".

Further, the token bucket control by the second rate control unit 37 is the same as that by the first rate control unit 35. The received frame not discarded during the rate control by the first rate control unit 35 and the second rate control unit 37 is input to the frame switch unit 30. Further, the first upper limit rate or the second upper limit rate needs to be set to be equal to or larger than the physical rate of the receiving port in order for the first rate control unit 35 or the second rate control unit 37 not to discard the frames.

When the MAC DA of the received frame has not been known, the frame switch unit 30 copies the received frame, and transfers the copied frame to the line IF card 10 which accommodates a designated line port according to the frame copy information. When the MAC DA has been known by a learning process, the frame switch unit 30 transfers the received frame to the line IF card 10 designated with an IF card number stored in the MAC table 32 in association with the MAC DA.

Figure 9:
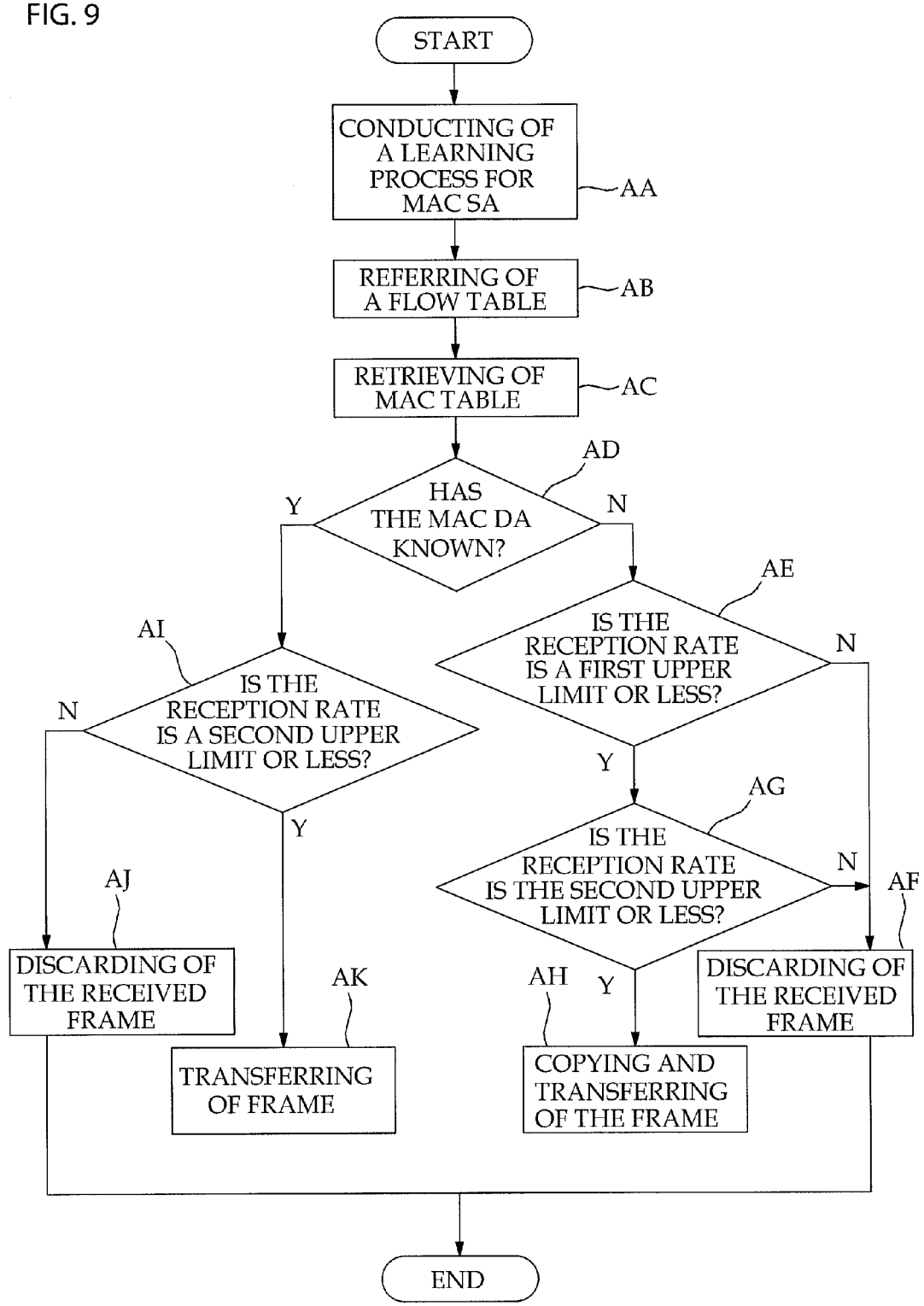
FIG. 9 is a flowchart illustrating an exemplary operation of a switch circuit.

FIG. 9 is a flowchart illustrating an example of an operational process of the SW circuit 11. A series of operations explained with reference to FIG. 9 may be translated as a method including a plurality of sequences. In this case, "operation" may be read interchangeably with "step".

When the SW circuit 11 receives a frame, the MAC table control unit 31 conducts a learning process for the MAC SA of the received frame at operation AA. At operation AB, the transfer processing control unit 33 references the flow table 34 to read a first flow ID, a second flow ID and frame copy information.

At operation AC, the MAC table control unit 31 retrieves the MAC DA of the received frame from the MAC table 32. When the MAC DA has been known by a learning process ("YES" at operation AD), the process proceeds to operation AI. When the MAC DA has not been known ("NO" at operation AD), the process proceeds to operation AE.

At operation AE, the first rate control unit 35 determines whether the rate of the first flow to which the received frame allocated is equal to or less than the first upper limit rate. When it is determined that the rate of the first flow is equal to or less than the first upper limit rate ("YES" at operation AE), the process proceeds to operation AG. When it is determined that the rate of the first flow is not equal to or less than the first upper limit rate ("NO" at operation AE), the process proceeds to operation AF. At operation AF, the first rate control unit 35 discards the received frame. Thereafter, the operational process of the SW circuit 11 for the received frame ends.

At operation AG, the second rate control unit 37 determines whether the rate of the second flow to which the received frame allocated is equal to or less than the second upper limit rate. When it is determined that the rate of the second flow is equal to or less than the second upper limit rate ("YES" at operation AG), the process proceeds to operation AH. When it is determined that the rate of the second flow is not equal to or less than the second upper limit rate ("NO" at operation AG), the process proceeds to operation AF.

At operation AH, the frame switch unit 30 copies the received frame and transfers the copied frame to the line IF card 10 which accommodates a designated line port according to the frame copy information. Thereafter, the operational process of the SW circuit 11 for the received frame ends.

At operation AI, the second rate control unit 37 determines whether the rate of the second flow to which the received frame is allocated is equal to or less than the second upper limit rate. When it is determined that the rate of the second flow is equal to or less than the second upper limit rate ("YES" at operation AI), the process proceeds to operation AK. When it is determined that the rate of the second flow is not equal to or less than the second upper limit rate ("NO" at operation AI), the process proceeds to operation AJ.

At operation AJ, the second rate control unit 37 discards the received frame. Thereafter, the operational process of the SW circuit 11 for the received frame ends. At operation AK, the frame switch unit 30 transfers the received frame to the line IF card 10 according to the MAC table 32. Thereafter, the operational process of the SW circuit 11 for the received frame ends.

According to the present embodiment, when the MAC DA of the received frame has not been known, it becomes possible to control the rate of the received frame to be subjected to the flooding before the frame is copied. Accordingly, the number of frames broadcasted due to the flooding may be reduced and thus, the influence that other traffic suffers due to the network congestion is reduced.

Further, the rate of the received frame to be subjected to the flooding is controlled before the frame is copied and thus, the number of copies of frame in the frame transfer apparatus is reduced. Therefore, congestion within the frame transfer apparatus is decreased. Further, a processing load of the frame transfer apparatus is reduced due to the reduction of the copy processing.

Further, in the present embodiment, the received frame is distributed to a plurality of first flows and a plurality of second flows according to the VID, and the rate of the received frame is controlled by the first rate control unit 35 and the second rate control unit 37. Accordingly, it is possible to suppress a traffic being flooded first and comprehensively control the flow rate including the flooding traffic and non-flooding traffic.

Further, any first flow ID and second flow ID are allocated to the line port and the VID using the flow table 34 and thus, it becomes possible to freely gather any line port and the VID to perform a rate control.

Second Embodiment

In the present embodiment, the first rate control unit 35 performs a rate control of the first flow according to the number of times that the frame is to be copied specified by the frame copy information in the flow table 34. For example, when the rate produced by multiplication of the rate of the first flow by the number of times that the frame is to be copied exceeds the first upper limit rate, the first rate control unit 35 may discards the received frame.

For example, the first rate control unit 35 may perform the token bucket control according to the number of times that the frame is to be copied. In a case where the number of tokens within the bucket becomes less than "0" when the tokens corresponding to a value produced by multiplication of the number of bytes which amounts to the length of packet of the received frame and the number of times that the frame is to be copied are taken out, the first rate control unit 35 may determine that the total sum of the rates of the first flows exceeds the first upper limit rate.

FIG. 10 is a view explaining a second example of the flow table 34. The flow table 34 may include "the number of times that frame is to be copied" obtained by calculating the number of times that the frame is to be copied defined by the frame copy information in advance, in addition to information elements described with reference to FIG. 7. In this modified embodiment, the first rate control unit 35 may calculate the number of times that the frame is to be copied defined by the frame copy information.

According to the present embodiment, it becomes possible to perform a rate control with respect to the traffic to be flooded according to the number of copies of frame and thus, it becomes possible to more efficiently reduce the number of frames to be flooded. Further, similarly to the third embodiment described below, a rate control of the first flow may be conducted according to the number of times that the frame is to be copied.

Third Embodiment

Figure 11:
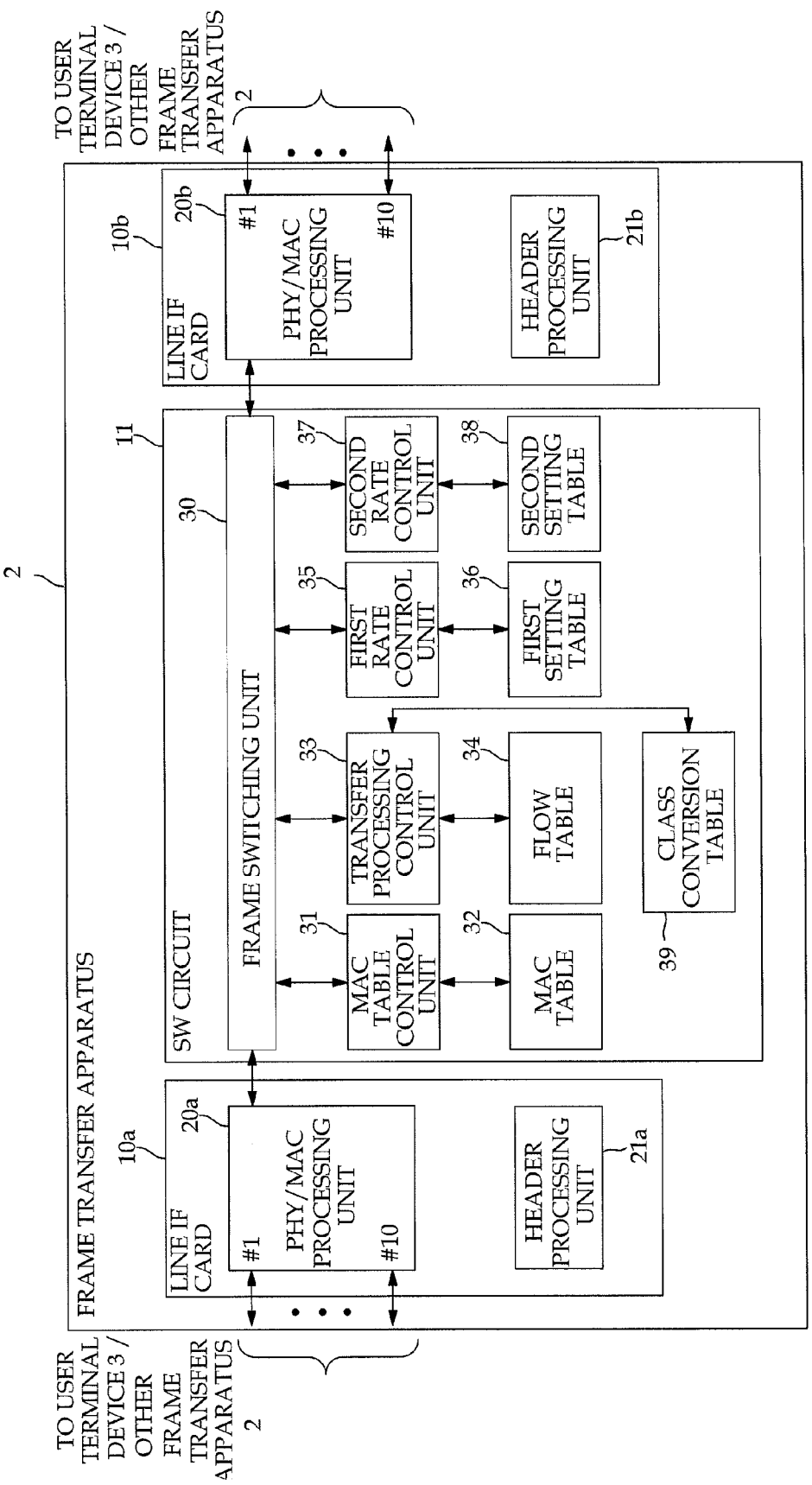
FIG. 11 is a functional block diagram illustrating a configuration of a second embodiment of the frame transfer apparatus.

In the present embodiment, the first upper limit rate and the second upper limit rate varies according to the priority of the received frame. FIG. 11 is a functional block diagram illustrating a configuration of a second embodiment of the frame transfer apparatus 2. The same components as those illustrated in FIG. 3 are indicated by the same reference numerals as used in FIG. 3, and the description for the same function thereof will be omitted. The frame transfer apparatus 2 includes a class conversion table 39.

FIG. 12 is a view explaining a third example of the flow table 34. The flow table 34 includes "class conversion ID" as the information element in addition to the information element described with reference to FIG. 7. The "class conversion ID" identifies a conversion rule in which the priority designated in the priority field 112 of the VLAN Tag field of the received frame is converted into another priority in the frame transfer apparatus 2 used for conversion of the first upper limit rate and the second upper limit rate.

In the following description, the priority designated in the priority field 112 may be represented as "VLAN priority". The respective VLAN priorities having values of "0(000)" to "7(111)" may be represented as the "VLAN priority #0" to "VLAN priority #1", respectively. A priority in the frame transfer apparatus 2 used for conversion of the first upper limit rate and the second upper limit rate may be represented as "internal priority". The internal priority may be designated as three stages of priority, for example, "high priority", "intermediate priority" and "low priority".

Any class conversion ID is allocated to each combination of the source card number, the source port number and the VID by the flow table 34 and thus, the VLAN priority may be converted into the internal priority using a different conversion rule for each flow or user.

FIG. 13 is a view explaining an example of a class conversion table 39. The class conversion table 39 defines a conversion rule which converts a priority from the VLAN priority to the internal priority. The class conversion table 39 is referenced by using the class conversion ID and the VLAN priority as an index in an index column, and includes the "internal priority" as the information element. For example, when the value of the class conversion ID is "class conversion ID #0", the first entry converts the "VLAN priority #0" into "low priority" of the internal priority.

FIG. 14A is a view explaining a second example of the first setting table 36. Different first upper limit rates and burst sizes are set according to the "high priority", the "intermediate priority" and the "low priority" of the internal priority. The first rate control unit 35 reads the first upper limit rate and the burst size according to the internal frame of the received frame from the first setting table 36 to perform a token bucket control for the first flow.

FIG. 14B is a view explaining a second example of the second setting table 38. Different second upper limit rates and burst sizes are set according to the "high priority", the "intermediate priority" and the "low priority" of the internal priority. The second rate control unit 37 reads the second upper limit rate and the burst size according to the internal frame of the received frame from the second setting table 38 to perform a token bucket control for the second flow.

According to the present embodiment, it becomes possible to suppress the flooding traffic according to the priority of the received frame, or the priority designated according to each flow or user.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A frame transfer apparatus comprising:
a memory coupled to a processor, the memory storing an address and a port in association with the address;
a receiver configured to receive a frame;
a switch circuit configured to determine an output port based on a destination address of the received frame; and
a transmitter configured to transmit the received frame, from the output port determined by the switch circuit, wherein the switch circuit is configured to:
determine whether the destination address of the received frame has already been stored in the memory and to allocate the received frame to a first flow identified by a first flow identifier and a second flow identified by a second flow identifier;
when it is determined that the destination address of the received frame has not already been stored in the memory,
determine whether a transfer rate of the first flow to which the received frame is allocated is equal to or less than a first upper limit transfer rate, when the transfer rate of the first flow is equal to or less than the first upper limit transfer rate, determine whether a transfer rate of the second flow to which the received frame is allocated is equal to or less than a second upper limit transfer rate, when the rate of the second flow is equal to or less than the second upper limit transfer rate, control the first upper limit transfer rate in the output port so as to set less than the second upper limit transfer rate and copy the received frame and transfer the received frame and the copied received frame on the first flow, and when either the rate of the first flow greater than the first upper limit transfer rate or the rate of the second flow is greater than the second upper limit transfer rate, discard the received frame, and
when it is determined that the destination address of the received frame has already been stored in the memory,
determine whether the transfer rate of the second flow to which the received frame is allocated is equal to or less than the second upper limit transfer rate, when the transfer rate of the second flow is equal to or less than the second upper limit transfer rate, transfer the received frame on the second flow, and when the rate of the second flow is greater than the second upper limit transfer rate, discard the received frame.

2. A frame transfer method implemented in a frame transfer apparatus including a storage unit configured to store an address and a port in association with the address, the frame transfer method comprising:
receiving a frame;
determining an output port based on a destination address of the received frame; and
transmitting the received frame, from the determined output port;
determining whether the destination address of the received frame has already been stored in the storage unit and allocating the received frame to a first flow identified by a first flow identifier and a second flow identified by a second flow identifier;
when it is determined that the destination address of the received frame has not already been stored in the storage unit,
determining whether a transfer rate of the first flow to which the received frame is allocated is equal to or less than a first upper limit transfer rate, when the transfer rate of the first flow is equal to or less than the first upper limit transfer rate, determining whether a transfer rate of the second flow to which the received frame is allocated is equal to or less than a second upper limit transfer rate, when the transfer rate of the second flow is equal to or less than the second upper limit transfer rate, in the output port controlling the first upper limit transfer rate so as to set less than the second upper limit transfer rate and copying the received frame and transferring the received frame and the copied frame, and when either the transfer rate of the first flow is greater than the first upper limit transfer rate or the transfer rate of the second flow is greater than the second upper limit transfer rate, discarding the received frame; and
when it is determined that the destination address of the received frame has already been stored in the storage unit,
determining whether the transfer rate of the second flow to which the received frame is allocated is equal to or less than the second upper limit transfer rate, when the transfer rate of the second flow is equal to or less than the second upper limit transfer rate, transferring the received frame, and when the transfer rate of the second flow is greater than the second upper limit transfer rate, discarding the received frame.

3. A frame transfer apparatus comprising:
a memory coupled to a processor, the memory storing an address and a port in association with the address;
a receiver configured to receive a frame;
a switch circuit configured to determine an output port based on a destination address of the received frame; and
a transmitter configured to transmit the received frame, from the output port determined by the switch circuit, wherein the switch circuit is configured to:
determine whether the destination address of the received frame has already been stored in the memory and to allocate the received frame to a first flow identified by a first flow identifier and to a second flow identified by a second flow identifier;
when it is determined that the destination address of the received frame has not already been stored in the memory, control the first upper limit transfer rate in the output port so as to set less than the second upper limit transfer rate, and when it is determined that the transfer rate of the first flow is equal to or less than the first upper limit transfer rate, copy the received frame and transfer the received frame and the copied frame on the first flow, and when the transfer rate of the first flow is greater than the first upper limit transfer rate, discard the received frame is discarded, and when it is determined that the destination address of the received frame has already been stored in the memory, when it is determined that the transfer rate of the second flow is equal to or less than the second upper limit transfer rate, transfer the received frame on the second flow.

4. The frame transfer apparatus according to claim 1, wherein the first flow identifier includes a virtual local area network identifier included in the received frame and the second flow identifier includes the virtual local area network identifier included in the received frame.

5. The frame transfer method according to claim 2, wherein the first flow identifier includes a virtual local area network identifier included in the received frame and the second flow identifier includes the virtual local area network identifier included in the received frame.

6. The frame transfer apparatus according to claim 3, wherein the first flow identifier includes a virtual local area network identifier included in the received frame and the second flow identifier includes the virtual local area network identifier included in the received frame.

* * * * *